United States Patent [19]
Engelke et al.

[11] Patent Number: 5,351,288
[45] Date of Patent: * Sep. 27, 1994

[54] VOICE BRIDGE FOR A RELAY CENTER

[75] Inventors: Robert M. Engelke, Madison; Kevin Colwell, Middleton; EDward Gisske, Verona; Ronald Schultz, Madison, all of Wis.

[73] Assignee: Ultratec, Inc., Madison, Wis.

[*] Notice: The portion of the term of this patent subsequent to Jan. 14, 2009 has been disclaimed.

[21] Appl. No.: 842,943

[22] Filed: Jan. 9, 1992

Related U.S. Application Data

[63] Continuation-in-part of Ser. No. 616,720, Nov. 16, 1990, Pat. No. 5,081,673, which is a continuation of Ser. No. 255,357, Oct. 11, 1988, abandoned.

[51] Int. Cl.$^5$ .............................. H04M 11/00
[52] U.S. Cl. ........................ 379/98; 379/52; 379/96
[58] Field of Search .............. 379/52, 98, 96, 97, 379/94, 93, 214; 340/825.19

[56] References Cited

U.S. PATENT DOCUMENTS

| | | | |
|---|---|---|---|
| 3,585,303 | 6/1971 | Chieffo | 379/52 |
| 3,896,267 | 7/1975 | Sachs et al. | 379/52 |
| 4,012,599 | 3/1977 | Meyer | 379/52 |
| 4,191,854 | 3/1980 | Coles | 379/52 |
| 4,268,721 | 5/1981 | Nielson et al. | 379/52 |
| 4,426,555 | 1/1984 | Underkoffler | 379/52 |
| 4,503,288 | 3/1985 | Kessler | 379/96 |
| 4,524,244 | 6/1985 | Faggin et al. | 379/96 |
| 4,650,927 | 3/1987 | James | 379/52 |
| 5,081,673 | 1/1992 | Engelke et al. | 379/52 |

FOREIGN PATENT DOCUMENTS

| | | | |
|---|---|---|---|
| 57-55749 | 4/1982 | Japan | 379/52 |
| 68-134568 | 8/1983 | Japan | 379/52 |
| 2183880 | 6/1987 | United Kingdom | 379/52 |

*Primary Examiner*—Curtis Kuntz
*Assistant Examiner*—Stella L. Woo
*Attorney, Agent, or Firm*—Quarles & Brady

[57] ABSTRACT

A voice bridge for a telephone relay for the hearing impaired is constructed so as to pass voice data to and/or from a user who is capable of either speaking or hearing voice. The voice bridge is capable of passing voice communication between a pair of telephone lines while excluding data carrier TDD signals from passage. Several methods are possible to achieve TDD signal exclusion. A privacy option is also included to exclude the relay station operator from overhearing parts of conversation when the operator's assistance is not required.

11 Claims, 7 Drawing Sheets

VOICE BRIDGE FOR A RELAY CENTER

CROSS-REFERENCE TO RELATED APPLICATION

This application is a continuation-in-part of application Ser. No. 07/616,720 filed Nov. 16, 1990, now U.S. Pat. No. 5,081,673, which was in turn a continuation of application Ser. No. 07/255,357 filed Oct. 11, 1988, now abandoned.

FIELD OF THE INVENTION

The present invention relates generally to relay centers that allow telephone communication between a hearing-impaired party using telecommunications devices for the deaf (TDD) and a non-TDD equipped hearing party, and particularly pertains to a voice bridge that allows voice to pass in one or both directions through the relay.

BACKGROUND OF THE INVENTION

The deaf or hearing-impaired that cannot hear well enough to use the telephone use communication terminals to converse over telephone lines. Such terminals are referred to as telecommunication devices for the deaf, or TDDs, and are comprised of a keyboard and display. TDDs are connected to a telephone line through a modem which allows the terminal to transmit information over a telephone line to another electronic device which is connected to the telephone line through another modem. When characters are typed by a first party on the keyboard of a first terminal, tones corresponding to the characters are transmitted via the modem through the telephone line to a second terminal. At the second terminal, the tones are received by a second modem and converted back to characters to be read by a second party. In this manner, a conversation proceeds by the taking of turns by each of the users in the typing back and forth on the TDDs. In order to have a TDD conversation, however, both parties must have a TDD.

It is often necessary or desirable for a TDD user to call a telephone number that is not equipped with a TDD. These calls may be either emergency or non-emergency, e.g. telephone calls to police, employers, doctors, repair and maintenance workers, relatives and loved ones, etc. In order to make possible telephone calls between a TDD user and a non-TDD equipped telephone number, TDD relay centers have been established in many locations. A TDD relay center receives telephone calls from TDD users who request, via TDD, for a relay operator to place a call with a second party for them. The relay operator then calls the second party and tells the second party what the TDD caller is typing. When the second party talks, the operator then types back to the TDD caller. Conversely, a call through the relay center may originate from a non-TDD user wishing to communicate with a TDD user. The call then proceeds in the same manner.

Calls placed through a relay center can be frustrating in that they are slow and lack privacy. Those people that can speak, but not hear, may prefer to talk directly to the other party and have the operator type back the response. Similarly, a speech impaired caller would rather listen for themselves rather than have the operator interpret.

SUMMARY OF THE INVENTION

In accordance with the present invention, a voice bridge is incorporated into a TDD relay center that allows a voice to pass through a relay such that a hearing-impaired caller may speak directly to the other party. In the same way, a speech-impaired caller may listen to the other party and use a TDD to respond. By allowing voice to pass in one or both directions through the relay, the telephone calls are shorter and more like a conventional telephone call. The privacy of the caller increases in that the operator may be optionally prevented from hearing the voice portion of the conversation. In addition, the relay operator and the second party are prevented from hearing the TDD tones on the line, which may be loud and would otherwise prevent the operator from talking to the second party.

Where the option to prevent the operator from hearing the voice portion of the conversation is exercised, the task of the operator may be facilitated in that the operator does not have to distinguish between the voices of the two parties before typing. Such an arrangement is less burdensome and less confusing to the operator because only one half of the conversation needs to be monitored and interpreted.

It is an object of the present invention to allow voice and data to interchange automatically through a relay center for the hearing impaired with maximum flexibility so that voice communications are passed whenever possible while screening hearing persons to be screened from data signals.

It is a further object of the invention to shorten relay center calls.

It is yet another object of the invention to increase the privacy of the caller.

Further objects, features, and advantages of the invention will be apparent from the following detailed description taken in conjunction with the accompanying drawings.

DESCRIPTION OF THE PREFERRED EMBODIMENTS

Figure 1:
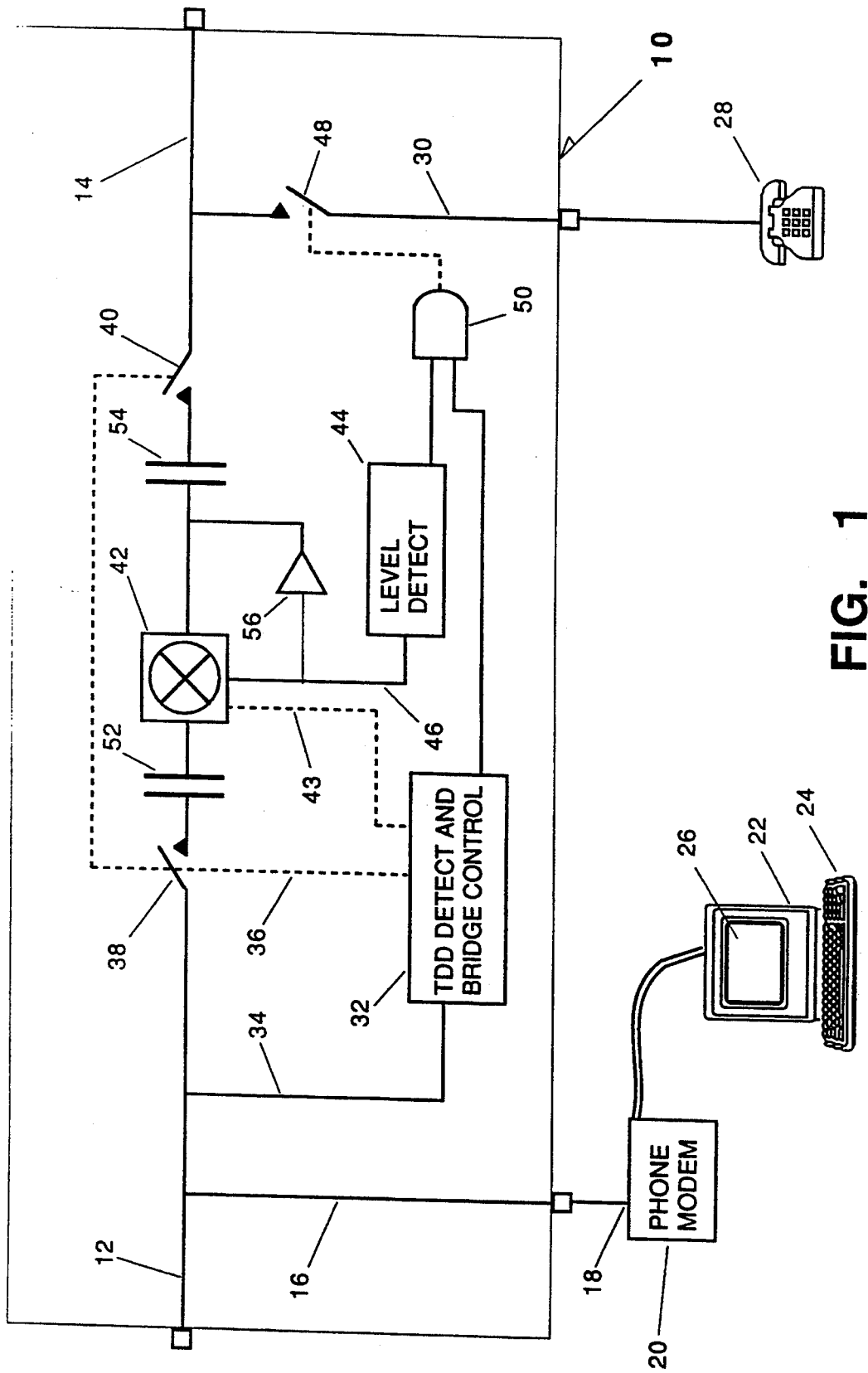
FIG. 1 is a schematic drawing of a first embodiment of a voice bridge according to the present invention, the switching arrangement representing the mode in which the voice bridge is disabled.

With reference to the drawings, a first embodiment of a voice bridge for a relay center is shown at 10 in FIG. 1. A first telephone line 12 originates from a TDD (telecommunications devices for the deaf) user and a second telephone line 14 is connected to a non-TDD user. A TDD is comprised of a keyboard, a display, and a modem, and may operate in any of a number of digital signal communication protocols, such as Baudot, ASCII or CCITT. During a typical relay call through the relay center without a voice bridge, a line 16 leading from the telephone line 12 is connected through a telephone link 18 to a modem 20. The modem 20 is then connected to a terminal or computer 22 having an associated keyboard 24 and display 26. Shown upon the display 26 is the message of the TDD user, which has been typed in at a keyboard of the TDD (not shown) of the TDD user, transmitted through the telephone line 12 by a modem of the TDD user (not shown), received by the modem 20, and translated back into a visual character set by the terminal or computer 22. A relay operator then reads the message to the non-TDD user over a telephone 28 which is connected to a line 30, the line 30 leading to the telephone line 14. When the non-TDD user responds, the message is transcribed by the relay operator to a character set by the keyboard 24, transmitted back through the telephone line 12 by the modem 20, received by the modem of the TDD user, and translated back into a character set by the computer or TDD of the TDD user. The telephone 28 is positioned proximate to the keyboard 24 and the display 26 so that the operator may operate the keyboard 24 and read the display 26 while manning the telephone 28. A TDD used by the operator is substitutable for the modem 20, the keyboard 24, and display 26, as a TDD comprises those elements.

To allow voice to pass from the telephone line 12 to the telephone line 14, or vice versa, the voice bridge 10 is used. In order to control the state of the voice bridge 10, circuitry to form a TDD detect and bridge control 32 is used. A line 34 from the telephone 12 leads to the TDD detect and bridge control 32. The logic of the TDD detect and bridge control acts on a line 36 to open and close switches 38 and 40 in unison to disable or enable the voice bridge 10. When TDD signals (i.e. digital signals) are detected on the line 34 originating from the line 12 or the line 16 by the TDD detect and bridge control 32, the switches 38 and 40 are opened, thereby disabling the voice bridge 10. When TDD signals are not detected on the line 34, the switches 38 and 40 are closed to allow voice or other audio to pass from the line 12 to the line 14, or from the line 14 to the line 12, whichever the case may be. Where the TDD user is hearing impaired but capable of speech, the direction of voice or other audio is from the line 12 to the line 14. Where the TDD user is speech impaired but capable of hearing, the direction of voice or other audio is from the line 14 to the line 12. A bridge polarity reversal switch 42 controls the direction of voice or other audio through a line 43 and is discussed further below.

A level detect circuit 44 may, upon command of either the TDD user or operator be used as a privacy option to prevent audio sounds on either of the lines 12 or 14 from being carried to the telephone 28. For the case of the hearing impaired TDD user capable of speech, the direction of the audio on the voice bridge 10 is from the telephone line 12 to the telephone line 14 when the voice bridge 10 is enabled. The level detect circuit 44 detects the audio as carried on a line 46 leading from the bridge polarity reversal switch 42. Where the audio level is sufficient and the bridge 10 is enabled (the bridge 10 is enabled when there are no TDD signals on the telephone line 12), a switch 48 on the line 30 is opened to prevent audio on the line 12 from being carried to the telephone 28, thus providing privacy to the TDD user. An AND gate 50, or equivalent, controls the opening and closing of the switch 48. The switch 48 is normally closed, but the switch 48 is opened when the privacy option is invoked and signals representing both a sufficient audio sound from the level detect circuit 44 and an enabled voice bridge 10 is received by the AND gate 50.

Where the direction of the audio on the voice bridge 10 is from the telephone line 14 to the telephone line 12 (i.e. a speech impaired user who is capable of hearing), the level detect circuit 44 may be used, upon command, to detect audio sounds on the line 14. Where the privacy option is invoked, the audio level is sufficient, and the bridge 10 is enabled (the bridge 10 is enabled when there are no TDD signals on the telephone line 12) the switch 48 is opened so that privacy is provided to the non-TDD user.

The voice bridge 10 comprises two coupling transformers 52 and 54 connected in series, an amplifier gain control stage 56, the TDD detect and bridge control 32, the level detect circuit 44, and the bridge polarity reversal switch 42. In operation, there are five possible modes, each of the modes representing different switching arrangements and direction of audio sounds through the voice bridge 10.

In the first mode as depicted in FIG. 1, the voice bridge 10 is disabled to allow TDD data from the TDD user to be received by the modem 20 where it is fed to the terminal or computer 22 and converted to a character set. As shown in FIG. 1, the switches 38 and 40 are opened and the voice bridge 10 is disabled. The relay operator reads the message from the TDD user displayed upon the keyboard 24 over the telephone 28; the switch 48 is closed to allow the voice of the relay operator to be carried on the line 14. The voice of the non-TDD user is also carried back to the operator on the lines 14 and 30 so that the operator may transcribe the vocal message from the non-TDD user into a character set via the keyboard 24 and transmitted across the telephone line 12 by the modem 20.

A second mode of operation occurs when a hearing-impaired TDD user is capable of speech and privacy is not invoked when audio sounds are carried through the voice bridge 10 from the telephone line 12 to the telephone line 14. The bridge 10 from the line 12 to the line 14 may be requested by a string or sequence of characters typed in on the TDD user terminal (not shown) or on the operator terminal 22 such that the TDD detect and bridge control 32 is prompted to create the bridge through the line 43. The particular string or sequence characters is pre-selected and known to the TDD user and the operator to prompt the creation of the bridge in a particular direction. For example, this second mode may be prompted by the entering of the command "/ bridge out" at the beginning of a line of character text. The "/ bridge out" command is meant to be exemplary; other character strings or sequences could be created to prompt the creation of the bridge. Such a command should be one that is not likely in normal conversation. The TDD detect and bridge control 32 detects the string of characters and enables the bridge 10 to operate in the direction of telephone line 12 to the telephone line 14 through the bridge polarity reversal switch 42. It is also possible that touch tone signals of the TDD user phone arranged in a particular sequence may be used as a command to prompt the creation of the bridge. When the directional command specifying a voice bridge from the telephone line 12 to the telephone line 14 is received by the TDD detect and bridge control 32, the bridge 10 is immediately disabled when TDD signals are detected on the telephone line 12 (originating from either the TDD user or operator) so that the TDD signals are not sent through to either the telephone 28 or the telephone line 14, which would otherwise be a significant distraction to either the operator or the non-TDD user. The voice bridge 10 is enabled upon termination of TDD signals to allow the TDD user to speak to the non-TDD user. When the bridge from the telephone line 12 to the telephone line 14 is initially established, the system is preferably designed to automatically send a character set message back to the TDD user acknowledging that the bridge is established. A third mode of operation is identical to the second mode except that a privacy mode may be invoked that prevents the operator from hearing the audio sounds originating on the telephone line 12. After the request and acknowledgment of a bridge from the telephone 12 to the telephone line 14, the TDD user may further invoke privacy by a second command comprised of either a TDD character sequence or a sequence of touch tone signals of the TDD user phone. The particular string or sequence of characters is pre-selected and known to the TDD user and the operator to prompt the privacy option. For example, the TDD user would type in "/ privacy." The "/ privacy" command is meant to be exemplary; other character or touch tone sequences could be created to prompt the creation of the bridge. Such a command should be one that is not likely in normal conversation. When the voice bridge 10 is then enabled by the absence of TDD signals as soon as the TDD user speaks, the level detect circuit 44 cuts off the telephone 30 when the audio is detected on the line 12. The telephone 30 is cut off by the opening of the switch 48 in the manner described above. When there are no audio sounds or TDD signals carried on the line 12, the switch 48 closes so that the operator may converse with the non-TDD user on the telephone line 14. When the privacy mode is initially established, the system is preferably designed to automatically send a character set message back to the TDD user acknowledging that the privacy is established.

If the TDD user is speech impaired but capable of hearing, a fourth mode may be activated in which privacy is not invoked and where the voice bridge 10 carries the audio sounds from the telephone line 14 to the telephone line 12. The bridge 10 from the line 14 to the line 12 may be requested by a string of characters typed in on the TDD user terminal (not shown) or on the operator terminal such that the TDD detect and bridge control 32 is prompted to create the bridge through the line 43. For example, this fourth mode may be prompted by the entering of the command "/ bridge in" at the beginning of a line of character text. Such a command is not likely in normal conversation and the TDD detect and bridge control 32 detects the string of characters and enables the bridge 10 to operate in the direction of the telephone line 14 to the telephone line 12 through the bridge polarity reversal switch 42. The formation of the bridge may be alternately prompted by the touch tone signals of the TDD user phone. When the directional command specifying a voice bridge from the telephone line 14 to the telephone line 12 is received by the TDD detect and bridge control 32, the bridge is immediately disabled when TDD signals are detected on the telephone line 12 (originating from either the TDD user or the operator) so that the TDD signals are not sent through to either the telephone 28 or the telephone line 14, which would again be a significant distraction to either the operator or the non-TDD user. The voice bridge 10 is enabled upon termination of TDD signals to allow the non-TDD user to speak to the TDD user. When the bridge from the line 14 to the line 12 is initially established, the system is preferably designed to automatically send a character set message to the TDD user acknowledging that the bridge is established.

A fifth mode of operation combines the voice bridge of the fourth mode and the privacy feature of the third mode. In this case, the operator is precluded from hearing the audio sounds of the non-TDD user. The request for privacy may be entered by the operator on behalf of the non-TDD user, or it may be entered by the TDD user. When the voice bridge 10 is then enabled by the absence of TDD signals as soon as the non-TDD user speaks, the level detect circuit 44 cuts off the telephone 30 when audio is detected on the line 14. The telephone 30 is cut off by the opening of the switch 48, in the manner discussed above.

Unlike a traditional conference bridge which allows all the sounds in both directions to be heard by the operator and the second party, then, the voice bridge 10 of the present invention prevents the TDD data sounds from being passed to the operator and the second party, and upon a desired command, prevents the operator from hearing the voice part of the conversation in one direction. The voice bridge 10 detects the TDD signals on the telephone line 12 and disables the voice bridge 10 automatically when such TDD signals are detected. Conversely, the bridge 10 is enabled when the transmission of TDD signals is terminated. The voice bridge 10 may be controlled by either the TDD user or by the operator.

Figure 2:
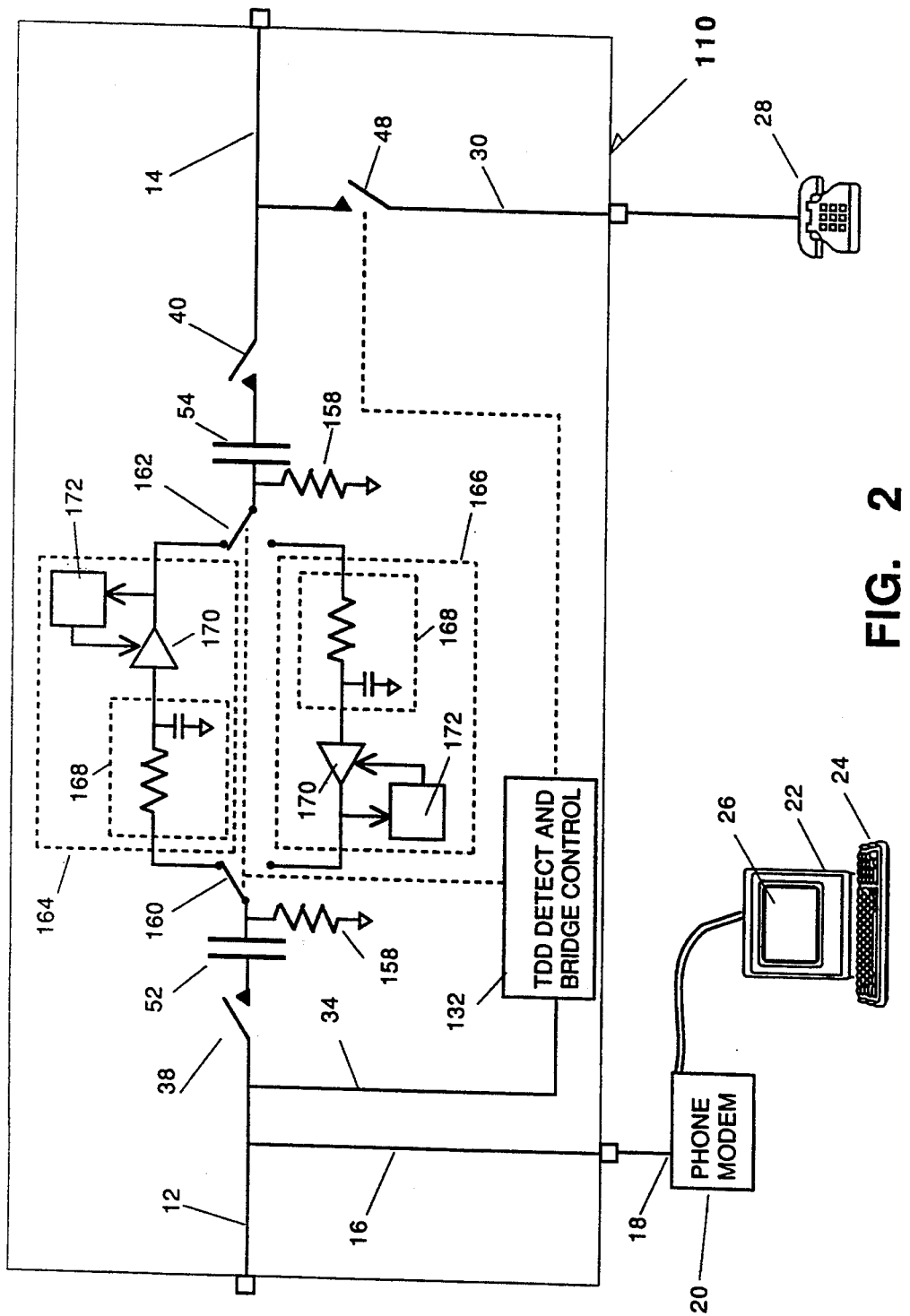
FIG. 2 is a schematic drawing of an alternative embodiment of a voice bridge constructed in accordance with the present invention.

Shown in FIG. 2 is an alternative embodiment for the construction of a voice bridge for a relay center. This embodiment is intended to be a system which is completely bi-directional in passing voice communication when actuated. By this it is meant that, excepting for the privacy option, the device is intended to allow full voice communication between all three parties at all times without the need for control, input of control characters or codes, or manual switching, by any of the parties. This embodiment thus operates, when actuated, automatically to pass voice to all other parties and operates only to inhibit data signal carrier passage through the bridge to hearing users.

In FIG. 2, the telephone lines 12, 14, 18, and 30, and the modem 20, display 26, and handset 28, may be identical to the corresponding parts in the embodiment of FIG. 1. Similarly, the switches 38 and 40, and the isolation transformers 52 and 54 are identical to those of FIG. 1. The parts which can be identical are given identical reference numerals. The TDD detect and bridge control is similar but not quite identical, and has thus been given the reference numeral 132 in FIG. 2. Turning to the new components in this version, a pair of resistors 158 are provided simply to provide proper impedance termination for the transformers 52 and 54. Connected to the respective isolated line from each of the two transformers 52 and 54 is one of a pair of commutating switches 160 and 162. The commutating switches 160 and 162 are illustrated in FIG. 2 as mechanical switches for purposes of simplicity of understanding, but are preferable high speed solid state analog switches, of which there are many readily available as integrated circuits. The logic, if not the physical reality, of the connection of the telephone line from the respective transformer to the respective commutating switch 160 or 162 is that the telephone line is connected to the pole of the switch and is rapidly switched back and forth between a pair of oppositely directed amplifier circuits 164 and 166. The commutating switches switch in tandem so that they are both always "thrown" in the same orientation, i.e. either to the amplifier circuit 164 or to the amplifier circuit 166. The amplifier circuits 164 and 166 are essentially identical, except for being oppositely oriented. The amplifier circuits are each one-directional, permitting signal passage only in a single direction. The amplifier circuit 164 is connected so as to pass signals from the transformer 52 to the transformer 54 while the amplifier circuit 166 is connected to pass signals from the transformed 54 to the transformer 52. Each of the amplifier circuits 164 and 166 includes a low pass filter 168, an amplifier 170, and an automatic gain control circuit 172. The amplifiers 170 and the automatic gain control circuits 172 are conventional widely used telephone components and the automatic gain controls 172 ensure that proper line driving levels are maintained at all times. The low pass filters 168 are intended to filter from the amplifier input signals the transients produced from the switching and to average, or maintain, the output level of the switches. Thus, the switching frequency is selected to be high in comparison to human auditory response and the typical bandwidth of a telephone line (approximately 3000 Hertz), and the low pass filters 168 ensure that the effect of the switching is hidden from the users.

In the embodiment of FIG. 2, the TDD detect and bridge control circuit 132 is relatively simple. Its function is to turn on and off the commutating switches 160 and 162. The TDD detect and bridge control circuit simply monitors the signals incoming on both of the telephone lines 12 and 14, to detect and differentiate voice signals from the data communication signals, be they Baudot, ASCII or CCITT. The TDD detect and bridge control circuit then simply temporarily halts communication of the switches 160 and 162 to disconnect transmission from the source of the data transmission, typically the line 12 to line 14 and/or line 30. Thus its operation is, in essence, transparent to all concerned, and anyone on the line may speak in voice, and all who can hear will hear the voice. This is done without compromising in any way the functionality of the relay center for the hearing-impaired user.

The advantage of this embodiment over the embodiment of FIG. 1 are most apparent during the process of initiating a relay center call. If the hearing person is calling on line 14, that caller speaks to the relay center operator through the operator's hand set 28. The operator then dials the telephone number of the hearing impaired person. It is typical that such a call, even if intended for a TDD, may result in a voice message to the caller, For instance, automated telephone switching company information (e.g. "line out of order" or "all circuits busy") are given in voice. Another possibility is that a hearing person or a telephone answering machine may answer the line. In any of these events, the person on line 14 and the operator both continuously hear whatever voice information is passed and also hear the normal auditory clues associated with the status of a telephone call such as ringing or busy signal. Yet the system is ready to receive a digital TDD signal whenever it is transmitted. This is a dramatic improvement over prior systems which require the operator to place the calling hearing person on hold while attempting to establish digital communication with the hearing-impaired person. The present system may also obviate the need for special control signals to be given to the voice bridge in order for it to operate in voice, since the system could always transmit voice in either direction whenever it is received.

If a privacy option is desired for the nonhearing but speaking person using the commutated approach, TDD detect and bridge control circuit 132 could simply be arranged to, upon request, disconnect the switch 48 whenever the amplifier circuit 164 is switched in. In other words, the two switches 48 and 160 are synchronized in their operation so that no signals at all pass from the line 12 to the line 30.

Although such a commutated approach is preferred, another variation along a similar approach is to utilize, instead of switches, permanent notch filters on the telephone lines which are narrowly designed to filter the carrier frequencies of the digital communication mode. The voice signals, which have much more widely distributed spectral characteristics, will be largely passed through the filters and will still be recognizable. This alternative, however, does not readily permit a privacy option.

Figure 3:
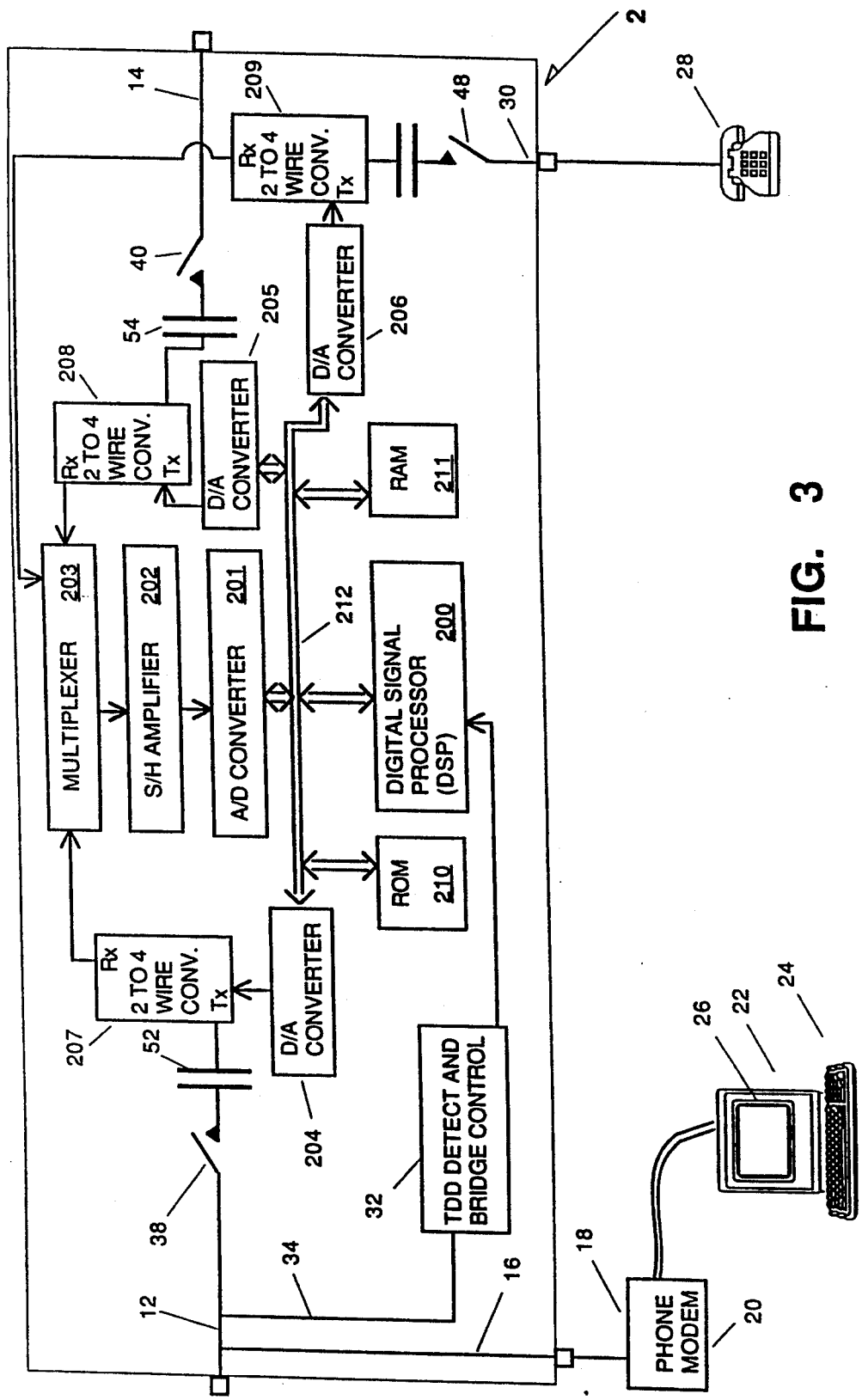
FIG. 3 is a schematic illustration of another alternative embodiment of the present invention.

Shown in FIG. 3 is a schematic for yet another alternative embodiment of the present invention. In this version, again identical parts have been given identical reference numerals. In this version the direct analog connection between the telephone lines, such as were present in both the version of FIGS. 1 and 2, is not present. Instead, all the signals from all three telephone lines are converted into digital, processed and the reconverted into analog. The advantage of the digital intermediate stage is that appropriate processing can be used to subtract unwanted signals from any line, thus allowing both control of the passage of digital TDD signals to the hearing listeners and also allowing the easy implementation of a privacy option.

An important component of the embodiment of FIG. 3 is a digital signal processing dedicated integrated circuit 200 (DSP). The DSP circuit can be any one of several commercially available integrated circuits which are designed to permit the digital processing, by appropriate algorithms, of analog signals which have been converted into digital form. The frequency of operation of such digital components as the DSP 200, and the other necessary circuit elements, is such that the processing can occur significantly faster than the 3000 Hertz bandwidth of the telephone line, and so this operation can be audibly transparent to the hearing users.

In detail, this approach requires that all three signals be converted into digital form. First, the two-wire output line are converted into four-wire lines using conventional analog two-wire to four-wire hybrid circuits which are indicated at 207 for the line 12, 207 for the line 14 and 209 for the line 30. The effect of the two-wire to four-wire conversion is to separate the signal coming into the voice bridge from the signal going out for each line. All the input signals are connected to a multiplexer 203, the output of which is connected to the input of a sample-and-hold (S/H) amplifier 202. The S/H amplifier has its output connected in turn to the input to an analog-to-digital (A/D) converter 201. The digital output of the A/D converter 201 is applied to a digital data bus 212, which is also connected to the data input and output from the DSP 200. Three digital-toanalog (D/A) converters 204, 205, and 206 are provided to convert the output digital signals on the digital data bus 212 back to analog signal to be passed to the respective telephone lines 12, 14, and 30. A read-only memory (ROM) 210 and a random access memory (RAM) 211 are also provided storing the code for the appropriate algorithms and the digital data respectively.

In its operation, the voice bridge of FIG. 3 converts the input analog signal on each of the three telephone lines to digital form which is imposed on the digital data bus 212. The signals on the three lines are multiplexed by the multiplexer 203 and stored in the S/H amplifier 202 simply to save the cost of providing three relatively expensive A/D converters. Alternatively, three A/D converters could be used. The output of the S/H amplifier 202 is them converted into digital by the A/D converter 201 and applied to the bus 212. The output signals on the bus are converted into analog by the D/A converters 204, 205, and 206. The difference here is what happens at the digital stage. In essence, the DSP 200 is capable of digitally altering the signals, and then directing different signals, by appropriate addressing, to each of the three D/A/converters 204, 205, and 206. For example, for TDD signal screening, the DSP can be programed, using any of several widely published techniques, to mathematically subtract out the portion of the signal corresponding to the TDD digital carrier signals. This digital processing can be used to remove from an analog signal the frequency components intended to carry digital information. Thus the digital carrier signal can be subtracted from the data on the bus 212 before any of the D/A converters 204, 205, or 206 are addressed so that no listener will be exposed to the digital carrier signals. This would allow the voice bridge to maintain carrier connection with a TDD on the line 12 without disturbing any user while always allowing all voice communications to pass to all users. This obviates a problem with some current voice bridge systems which cannot maintain carrier tones while permitting voice communications over the same lines.

Figure 4:
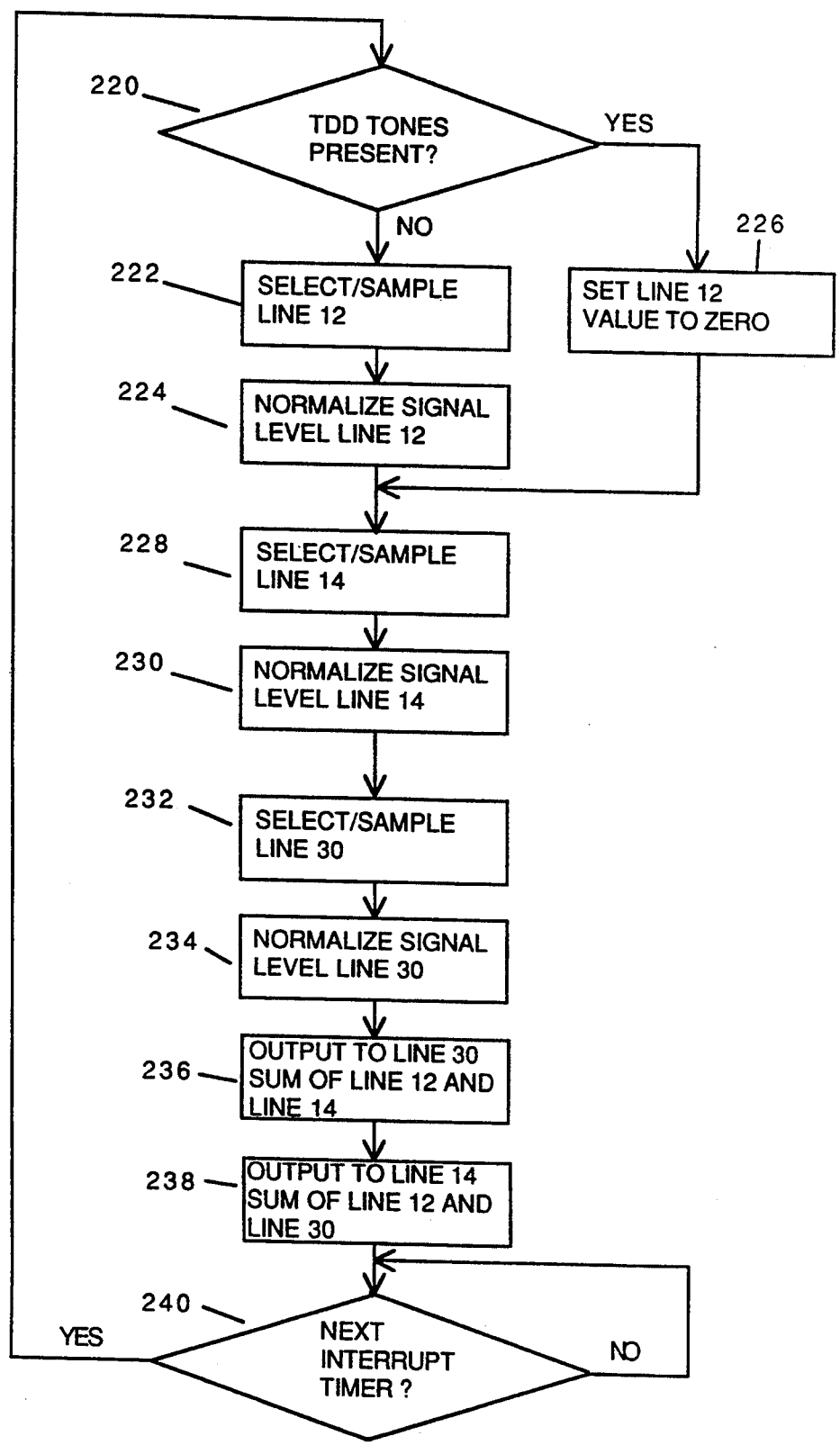
FIG. 4 is a flowchart illustrating one of the methods of operating the embodiment of FIG. 3.
Figure 5:
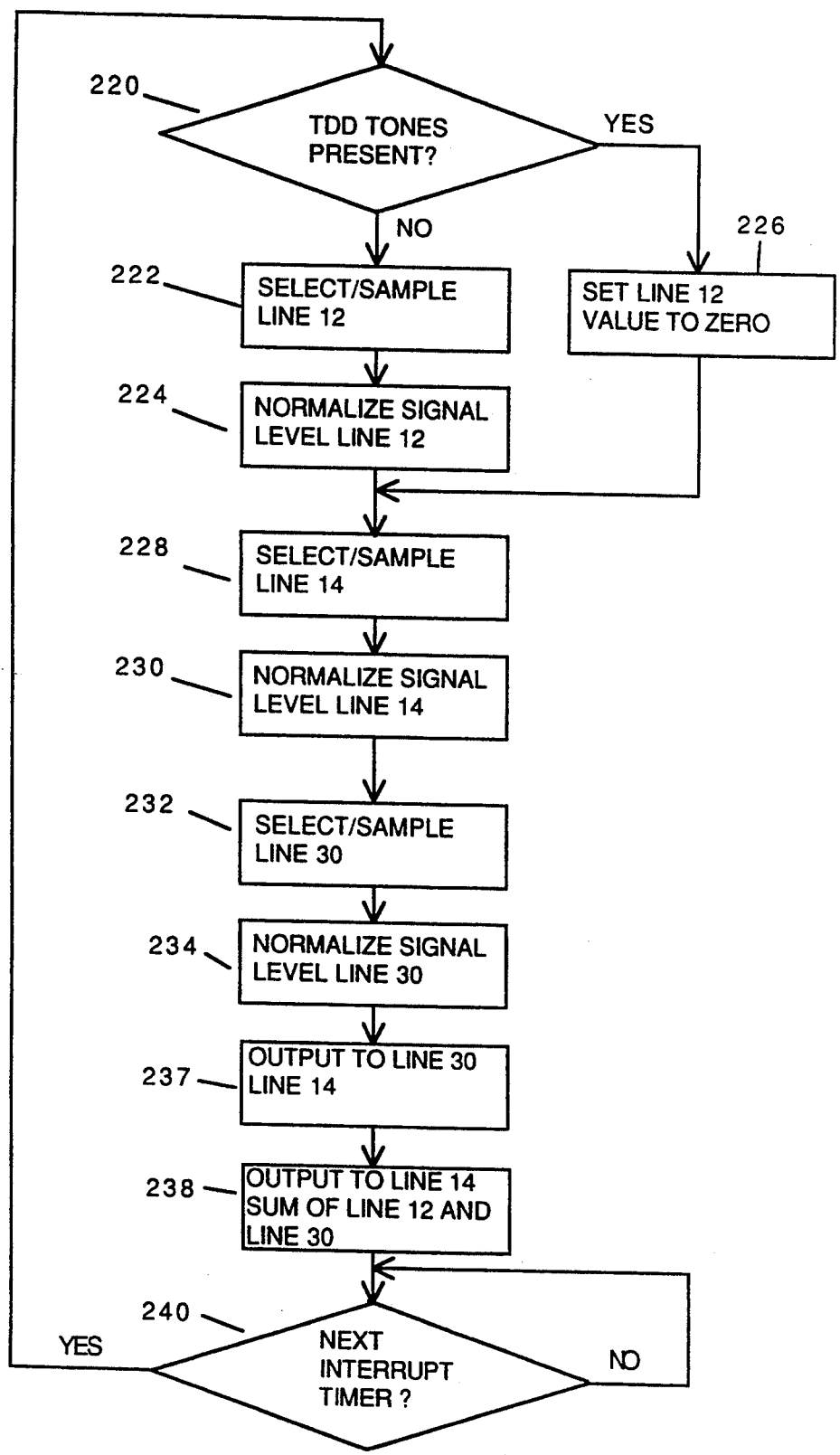
FIG. 5 is a flowchart illustrating another of the methods of operating the embodiment of FIG. 3.
Figure 6:
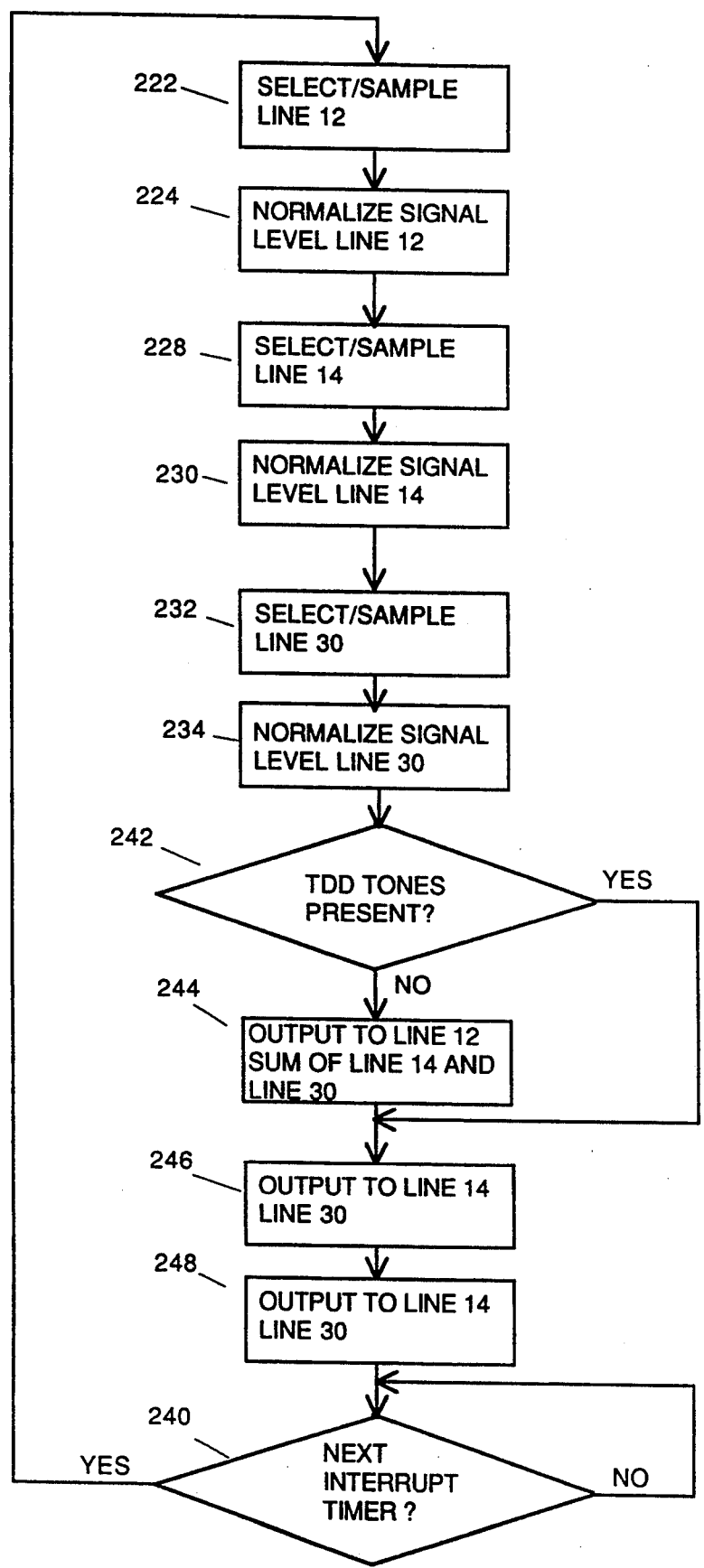
FIG. 6 is a flowchart illustrating yet another of the methods of operating the embodiment of FIG. 3.

The operation of this embodiment can best be understood with reference with the flow charts of FIGS. 4-6. These charts illustrate how the circuit of FIG. 3 would be used in some of its configurations.

The flowchart of FIG. 4 illustrates the condition of normal voice bridge operation, without privacy, where the voice bridge carries voice from the hearing impaired user over line 12 if and when that person speaks. The flowchart method begins with step 220 where the condition of presence or lack of TDD carrier signal is made. This is the test performed by the TDD bridge control circuit 32, or by the modem 20, with a single digital line output indicated whether or not TDD carrier tones are present. If TDD carrier tones are not present, the DSP 200 directs at 222 for the S/H amplifier 202 to capture a sample of the signal on line 12, and then the DSP normalizes that signal at 224. If the TDD carrier was present, the DSP 200 imposes a zero value for the output from line 12, as indicated at step 226. Then the DSP similarly directs sampling and holding of the signal from lines 14 and 30 at steps 228, 230, 232, and 234. The DSP then applies the mathematical sum of the values from lines 12 and 14 to the bus addressed to D/A converter 206, for line 30, as indicated at step 236. It is in this step that all the digital components are also subtracted from the line 12 values so that no carrier signals are presented on the other lines. The output addressed to line 14, through D/A converter 205, is the sum of the values for lines 12 and 30, as indicated at step 238. This routine assumes no voice pass-through to the hearing-impaired person on line 12. The last step is to test for an interrupt at step 240, before repeating. This step, which is a delay, helps to make the repetition rate of the procedure more regular, so that sampling occurs at a regular interval.

In the method of FIG. 5, the privacy option is invoked for a hearing impaired user on line 12 who can speak. All steps are the same except that instead of step 236, an alternative step 237 is inserted in which only the value from line 14 is provided to line 30. Thus the voice signal from line 12 is passed through only to the person on line 14, and not to the operator on line 30, for privacy reasons.

In the method of operation of FIG. 6, it is intended that inward voice carry-over be enable for the speech-impaired TDD user who can hear and understand voice. Steps 222, 224, and 228-234 are identical to the flowchart of FIG. 4 and represent the digital conversion of all three signals. In this variation, at step 242 a test is made for the presence of TDD digital signal on line 12. If TDD carrier tones are not present, at step 244 the DSP outputs to line 12 the sum of the values from lines 14 and 30. If TDD carrier tones are present, the step 244 is skipped, since the voice would be lost to the carrier in any event. At step 246, the output to line 14 is made of the value from line 30. At step 248, the output to line 30 is formulated from the value from line 14 only. After that, at step 240, the system tests for interrupts before repeating.

Thus use of the digital signal processing allows for any combination of voice and data to be used on common lines, and the methods illustrated in FIGS. 4-6 represent only some of the possibilities. What is advantageous about this approach is that it allows constant TDD communication while allowing voice to be passed at the same time whenever a hearing person is on the line. As voice is used, privacy may also be invoked so that the voice conversations of the users are not overheard by the operator.

Figure 7:
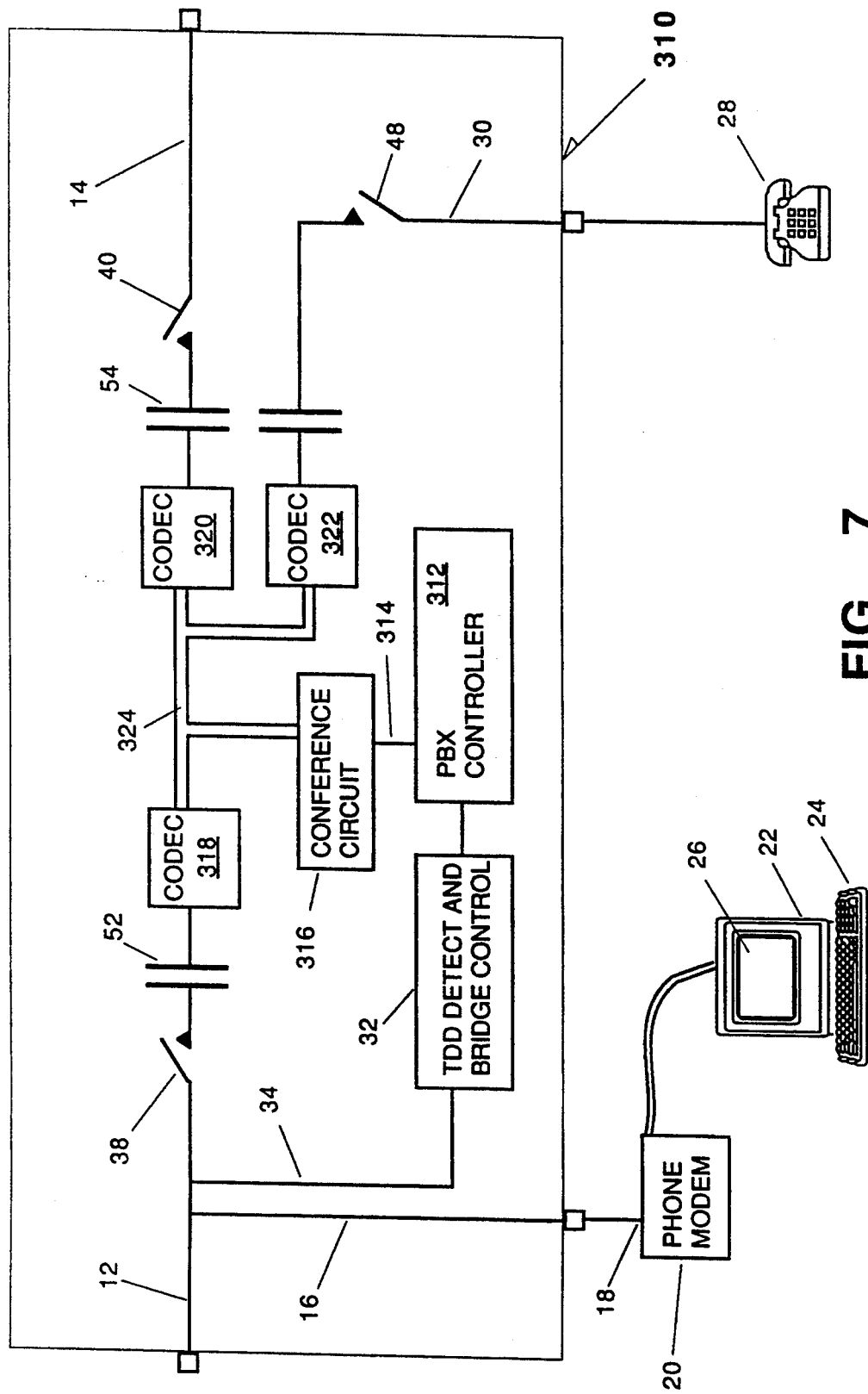
FIG. 7 is a schematic illustration of another alternative embodiment of the present invention.

Yet one more variation on the digital signal processing approach of FIGS. 3-6 is based on the use of a commonly available pulse code modulation (PCM) integrated circuits and is illustrated in FIG. 7. Pulse code modulation circuits are commonly known as "codecs" and are intended to permit digital telephones to be installed in local private branch exchange (PBX) telephone systems. In some PBX systems, codecs are connected on the various telephone lines serviced by the exchange and the lines can be interconnected, or "conferenced," by PCM conferencing circuits. Therefore such a PCM-based PBX could readily be converted to use as a voice-pass through bridge for a relay center by adding to the PBX a control function to disable conferencing in the presence of TDD carrier signals.

This variation is illustrated in FIG. 7 where the 2-to-4 wire circuits, the digital conversion and DSP circuit of FIG. 3 has been replaced by many of the components of a conventional, widely used, digital PBX system, including a PBX controller 312, which acts through control lines 314 to operate a conference circuit 316. Each of the input telephone lines 12, 14, and 30 is connected to a respective codec 318, 320, and 322. All the codecs 318, 320, and 322, and the conference circuit 316, are interconnected by a bus, referred to as a PCM highway 324. To convert these conventional PBX components to operate as a voice bridge for a relay center, a TDD detect and bridge control circuit 32 is needed. The TDD detect circuit 32 simply must detect the presence of TDD carrier signals on line 12 and provide an output signal to the PBX controller 312. The PBX controller 312 is capable, under software control, of controlling connections between the codecs over the PCM highway 324. Thus the PBX controller can simply be programmed to suspend the interconnection between the codec 318 on the one hand, and the codecs 320 and 322 on the other, when TDD carrier signals are detected on the line 12. The communication between the lines can readily be resumed when TDD carrier signals are no longer present.

This variant as illustrated here is slightly more limited than the embodiments of FIGS. 2 and 3 since, unlike those embodiments, this embodiment is not completely bi-directional. In both of the embodiments FIGS. 2 and 3, voice can be passed onto line 12, from lines 14 and 30, even if TDD signals are also carried on that line. This embodiment requires suspension of the connection between lines 12 and 14 when TDD signals are present. However, since this variation is largely based on PBX components already widely installed, it may be preferred in some instances, particularly where a retrofit is possible.

It is understood that the invention is not confined to the particular construction and arrangement of parts herein illustrated and described, but embraces such modified forms thereof as come within the scope of the following claims.

What is claimed is:

1. A voice bridge for a relay center, the voice bridge comprising:
   (a) first and second telephone lines;
   (b) a modem capable of receiving and transmitting data signals over the first telephone line:
   (c) a terminal having a keyboard and a display, the terminal converting the data signals received by the modem into readable characters and projecting the characters upon the display, and the terminal transmitting data signals that are entered upon the keyboard through the modem to the first telephone line;
   (d) a telephone that connects with the second telephone line, the telephone being positioned in such proximity to the keyboard and the display that an operator may read the characters exhibited on the display and voice any message formed by the characters into the telephone and the operator may transcribe any vocal message received on the telephone into the keyboard; and
   (e) means responsive to the presence of digital signals on the first telephone line for preventing transmission of digital signals from the first telephone line to the second telephone line while allowing voice signals to pass between the first and second telephone lines.

2. A voice bridge as claimed in claim 1 wherein the means responsive to the presence of digital signals includes a TDD detection means responsive to the presence of TDD signals on the first telephone line and means for switching the first telephone line from a state connected to the second telephone line to a state disconnected from the second telephone line.

3. A voice bridge as claimed in claim 2 wherein the switching means includes a pair of commutating switches switching the connection between the first and second telephone lines between a pair of one directional circuits.

4. A voice bridge as claimed in claim 3 wherein the pair of commutating switches are connected by oppositely oriented amplifier circuits, and two commutating switches normally switching at a rate well in excess of the bandwidth of the telephone line so that one or the other of the amplifier circuits is normally connected between the first and second telephone lines.

5. A voice bridge as claimed in claim 1 further comprising means for disconnecting the telephone for the operator from either of the first and the second telephone lines when voice is being received over the first telephone line.

6. A voice bridge as claimed in claim 1 further including analog-to-digital conversion means, digital-to-analog conversion means, and digital signal processing means, all connected for converting all signals received by the voice bridge into digital form, processing the signals in the digital form, and re-converting the signals from the digital form into analog form, the digital processing means effective so that portions of the signals corresponding to the TDD carrier are eliminated from the digital form of the signal, so that voice and not carrier signals are passed through the voice bridge.

7. A voice bridge for a relay center, the voice bridge comprising:
   (a) first and second telephone lines:
   (b) a modem capable of receiving and transmitting TDD signals over the first telephone line;
   (c) a terminal having a keyboard and a display, the terminal converting the TDD signals received by the modem into readable characters and projecting the characters upon the display, and the terminal transmitting TDD signals that are entered upon the keyboard through the modem;
   (d) a telephone that connects with the second telephone line, the telephone being positioned in such proximity to the keyboard and the display that an operator may read the characters exhibited on the display and voice any message formed by the characters into the telephone and the operator may transcribe any vocal message received on the telephone into the keyboard:
   (e) a detector connected to the first telephone line detecting TDD signals on the first telephone line and discriminating TDD signals from voice signals; and
   (f) means responsive to the detector for switching the first telephone line so that voice sounds from the first telephone line are passed to the second telephone line while TDD signals from the first telephone line are not passed to the second telephone line.

8. A voice bridge for a relay center comprising
   (a) first and second telephone lines;
   (b) means for converting digital signals received over the first telephone line into readable characters on a display screen which may be read by an operator;
   (c) a telephone connected to the second telephone line and located adjacent to the display screen so that the operator can converse with a hearing person on the second telephone line;
   (d) a pair of oppositely oriented one directional circuits;
   (e) a pair of commutating switches switching in unison to alternately connect one of the one directional circuits between the two telephone lines; and (f) digital data carrier detection and control means for causing the commutating switches to remain connected to only one of the one directional circuits when digital data is carried on the first telephone line to prevent passage of the digital data carrier signals to the second telephone line.

9. A voice bridge for a relay center, the voice bridge comprising:
   (a) first and second telephone lines;
   (b) a modem capable of receiving and transmitting data signals over the first telephone line;
   (c) a terminal having a keyboard and a display, the terminal converting the data signals received by the modem into readable characters and projecting the characters upon the display, and the terminal transmitting data signals that are entered upon the keyboard through the modem to the first telephone line;
   (d) a telephone connected to the second telephone line, the telephone being positioned in such proximity to the keyboard and the display that an operator may read the characters exhibited on the display and voice any message formed by the characters into the telephone and the operator may transcribe any vocal message received on the telephone into the keyboard; and
   (e) bi-directional means responsive to the presence of digital signals on the first telephone line for preventing transmission of digital signals from the first telephone line to the second telephone line while both passing voice signals from the first telephone line to the second telephone line and continuously passing all voice signals from the second telephone line to the first telephone line without interruption.

10. A voice bridge for a relay center, the voice bridge comprising:
    (a) first and second telephone lines;
    (b) a modem capable of receiving and transmitting data signals over the first telephone line;
    (c) a terminal having a keyboard and a display, the terminal converting the data signals received by the modem into readable characters and projecting the characters upon the display, and the terminal transmitting data signals that are entered upon the keyboard through the modem to the first telephone line;
    (d) a telephone connected to the second telephone line, the telephone being positioned in such proximity to the keyboard and the display that an operator may read the characters exhibited on the display and voice any message formed by the characters into the telephone and the operator may transcribe any vocal message received on the telephone into the keyboard;
    (e) a private branch exchange connecting the first and second telephone lines, the private branch exchange including a PBX controller, a codec attached to each telephone line and a pulse code modulation highway connecting the codecs under control of the PBX controller; and
    (f) TDD detecting means connected to the first telephone line and to the PBX controller and connected to cause the PBX controller to inhibit connection between the first and second telephone lines when a TDD signal is detected on the first telephone line.

11. A voice bridge for a relay center, the voice bridge comprising:
    (a) first and second telephone lines;
    (b) a modem capable of receiving and transmitting data signals over the first telephone line;
    (c) a terminal having a keyboard and a display, the terminal converting the data signals received by the modem into readable characters and projecting the characters upon the display, and the terminal transmitting data signals that are entered upon the keyboard through the modem to the first telephone line;
    (d) a telephone connected to the second telephone line, the telephone being positioned in such proximity to the keyboard and the display that an operator may read the characters exhibited on the display and voice any message formed by the characters into the telephone and the operator may transcribe any vocal message received on the telephone into the keyboard;
    (e) A/D conversion means to convert the input signals on each of the telephone lines to digital format;
    (f) D/A conversion means to convert digital signals to output signals on each of the telephone lines;
    (g) digital processing means connected to the A/D conversion means and the D/A conversion means for performing digital signal processing on the signals in digital form and then providing output signals to the telephone lines; and
    (h) TDD code detecting means connected to the first telephone line for detecting TDD carrier codes thereon and connected to the digital processing means so that the digital processing means can process out the TDD carrier signals before providing output to the telephone lines.

* * * * *